(12) United States Patent
Kapoor (10) Patent No.: US 7,941,098 B2
(45) Date of Patent: May 10, 2011

(54) COMMON DATA LINE SIGNALING AND METHOD

(75) Inventor: Ashok Kumar Kapoor, Palo Alto, CA (US)

(73) Assignee: SuVolta, Inc., Los Gatos, CA (US)

( * ) Notice: Subject to any disclaimer, the term of this patent is extended or adjusted under 35 U.S.C. 154(b) by 952 days.

(21) Appl. No.: 11/824,737

(22) Filed: Jul. 2, 2007

(65) Prior Publication Data
US 2009/0011710 A1    Jan. 8, 2009

(51) Int. Cl.
H04B 7/00    (2006.01)
(52) U.S. Cl. ....... 455/45; 455/313; 455/440; 455/456.1; 365/185.17; 365/189.02; 365/185.21; 365/200; 370/338; 370/335; 710/65; 710/315; 714/724; 327/103; 327/113
(58) Field of Classification Search ............... 455/42, 455/313, 323, 190.1, 131, 440, 456.1; 365/189.02, 365/185.17, 200; 710/65, 128, 315; 395/280, 395/888; 714/724; 370/338, 480, 335
See application file for complete search history.

(56) References Cited

U.S. PATENT DOCUMENTS

| | | | | |
|---|---|---|---|---|
| 5,987,541 A * | 11/1999 | Hewitt | ............................. | 710/65 |
| 6,324,104 B1 * | 11/2001 | Matsui | .......................... | 365/200 |
| 6,483,770 B2 * | 11/2002 | Noh et al. | ................. | 365/185.17 |
| 6,563,743 B2 * | 5/2003 | Hanzawa et al. | ........ | 365/189.02 |
| 7,054,296 B1 * | 5/2006 | Sorrells et al. | ................ | 370/338 |
| 7,292,835 B2 * | 11/2007 | Sorrells et al. | ................ | 455/313 |
| 7,434,125 B2 * | 10/2008 | Frankowsky | ................. | 714/724 |
| 7,711,368 B2 * | 5/2010 | Feher | ............................ | 455/440 |
| 2004/0080986 A1 * | 4/2004 | Hanzawa et al. | ........ | 365/189.02 |

OTHER PUBLICATIONS

PCT International Search Report and Written Opinion of the International Searching Authority for International Application No. PCT/US2008/067446, dated Jan. 14, 2009.

* cited by examiner

*Primary Examiner* — Lewis G West
*Assistant Examiner* — April G Gonzales
(74) *Attorney, Agent, or Firm* — Darryl G. Walker (57) ABSTRACT

A semiconductor device that includes transmitter circuits and receiver circuits that share a common data line and method is disclosed. Each transmitter circuit may include a frequency modulator that receives a stream of data and provides a frequency modulated data output at a predetermined carrier frequency. Each receiver may include a band pass filter that allows a corresponding frequency modulated data output from a corresponding transmitter circuit to pass through to a demodulator while essentially excluding the other frequency modulated data. In this way, a plurality of transmitter circuits can simultaneously transmit data with each one of the plurality of transmitter circuits transmitting data to a predetermined receiver circuit.

17 Claims, 7 Drawing Sheets

COMMON DATA LINE SIGNALING AND METHOD

TECHNICAL FIELD

The present invention relates generally to integrated circuits, and more particularly to a common data line signaling and method for semiconductor devices.

BACKGROUND OF THE INVENTION

As transistor device sizes continue to become smaller on semiconductor devices, the wiring for signal transmissions becomes a limiting factor in the overall size of the semiconductor device.

In a typical semiconductor device each data transmitting circuit has a dedicated data line wiring connected between the data transmitting circuit and the data receiving circuit. When there are a large number of data transmitting and data receiving circuits, a large area of the semiconductor device is consumed by the large number of data line wirings.

Figure 1:
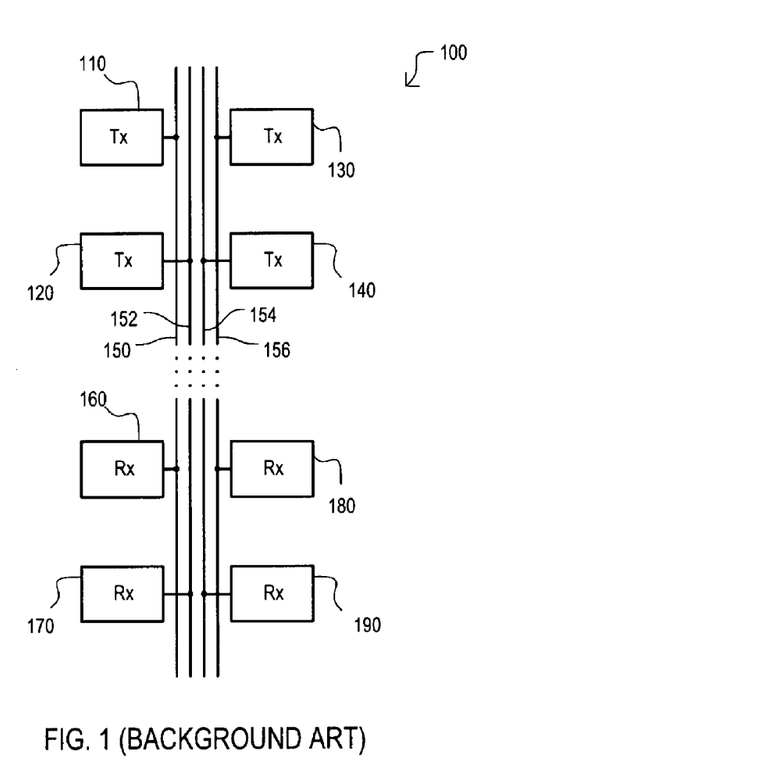
FIG. 1 is a block schematic diagram of conventional approach of data line wiring and data transmission in a semiconductor device.

An example illustrating the conventional approach of data line wiring and data transmission in a semiconductor device is set forth in a block schematic diagram in FIG. 1 and given the general reference character 100.

Semiconductor device 100 includes data transmission circuits 110 to 140, and data receiving circuits 160 to 190. Data transmission circuit 110 transmits data to data receiving circuit 160 along a dedicated data line wiring 150. Data transmission circuit 120 transmits data to data receiving circuit 170 along a dedicated data line wiring 152. Data transmission circuit 130 transmits data to data receiving circuit 180 along a dedicated data line wiring 156. Data transmission circuit 140 transmits data to data receiving circuit 190 along a dedicated data line wiring 154. Although only four data transmission circuits (110 to 140) and four data receiving circuits (160 to 190) are shown, semiconductor device 100 can include many such circuits with each data transmission circuit including a dedicated data line wiring.

Furthermore, each data line wiring typically uses the same wiring layer, for example a metal wiring layer. The data line wiring can also be typically laid out in a wiring channel, which may be excluded from having circuitry such as transistors. In such a case, the data line wiring can consume a lot of area, which makes the semiconductor device 100 have a larger "die size". With a larger "die size", fewer chips (i.e. semiconductor devices) can be manufactured on a single silicon wafer, which increases manufacturing costs.

It would be desirable to provide a method of decreasing the number of data line wirings on a semiconductor device and thereby reduce the "die size" to decrease manufacturing costs.

SUMMARY OF THE INVENTION

According to the present embodiments, a semiconductor device including a common data line in which data may be simultaneously transmitted to and from transmitter/receiver circuits is disclosed. The semiconductor device may include a plurality of common data lines. Each common data line may be coupled to a plurality of data transmitter/receiver circuits, respectively. Data may be transmitted from a first data transmitter/receiver circuit on a first common data line to a second data transmitter/receiver circuit on a second common data line while data is being transmitted from another data transmitter/receiver circuit from any common data line to a third data transmitter/receiver circuit on the first common data line.

In this way, the number of data lines may be reduced.

In one embodiment, data may be provided to a common data line after being frequency modulated.

In another embodiment, data may be provided to a common data line after undergoing a phase shift modulation.

In another embodiment, data may be provided to a common data line after an amplitude modulation is performed.

In another embodiment, a bridge circuit may be provided between a first common data line and a second common data line.

DETAILED DESCRIPTION OF THE EMBODIMENTS

Various embodiments of the present invention will now be described in detail with reference to a number of drawings. The embodiments show a method of sharing a common data line among a plurality of transmitter circuits and receiver circuits for a semiconductor device.

Figure 2:
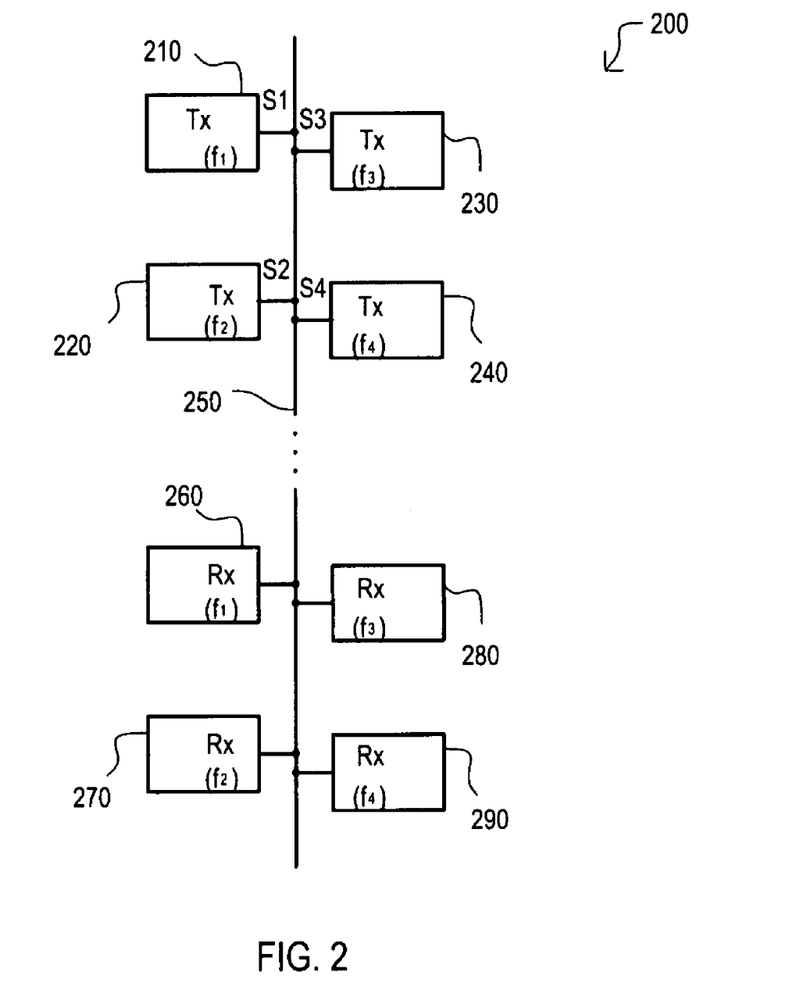
FIG. 2 is a block schematic diagram of a common data line sharing circuit according to an embodiment.

Referring now to FIG. 2, a block schematic diagram of a common data line sharing circuit according to an embodiment is set forth and given the general reference character 200.

Common data line sharing circuit 200 can be integrated on a single semiconductor device. Common data line sharing circuit 200 can include transmitter circuits (210 to 240) and receiver circuits (260 to 290). Transmitter circuits (210 to 240) and receiver circuits (260 to 290) may share a common data line 250. Common data line 250 can be a data line wiring using, for example, a metal wiring layer or the like in a semiconductor device.

Each transmitter circuit (210 to 240) may transmit data that has undergone a frequency modulation at a predetermined carrier frequency. Transmitter circuit 210 may transmit data (SI) that has undergone a frequency modulation at a carrier frequency $f_1$. Transmitter circuit 220 may transmit data (S2) that has undergone a frequency modulation at a carrier frequency $f_2$. Transmitter circuit 230 may transmit data (S3) that has undergone a frequency modulation at a carrier frequency $f_3$. Transmitter circuit 240 may transmit data (S4) that has undergone a frequency modulation at a carrier frequency $f_4$. Carrier frequencies ($f_1$, $f_2$, $f_3$, and $f_4$) are different distinct frequencies in an operational frequency spectrum of the components (such as bipolar junction transistors) used to configure the transmission circuits (210 to 240). In the particular embodiment, the bipolar junction transistors may have a cut-off frequency of about 30-50 GHz.

Each receiver circuit (260 to 290) can allow a respective predetermined frequency band to pass from a predetermined transmitter circuit (210 to 240). Receiver circuit 260 may allow a band around predetermined frequency $f_1$ to pass while filtering out the frequencies ($f_2$, $f_3$, and $f_4$). Receiver circuit 270 may allow a band around predetermined frequency $f_2$ to pass while filtering out the frequencies ($f_1$, $f_3$, and $f_4$). Receiver circuit 280 may allow a band around predetermined frequency $f_3$ to pass while filtering out the frequencies ($f_1$, $f_2$, and $f_4$). Receiver circuit 290 may allow a band around predetermined frequency $f_4$ to pass while filtering out the frequencies ($f_1$, $f_2$, and $f_3$). In this way, transmitter circuits (210 to 240) can transmit data to a predetermined receiver circuit (260 to 290) along a common data line 250 by transmitting data at a respective predetermined carrier frequency ($f_1$ to $f_4$).

Note, although the common data line sharing circuit 200 of FIG. 2, shows four transmitter circuits (210 to 240) and four receiver circuits (260 to 290), there may be any number of transmitter and/or receiver circuits having predetermined carrier frequencies.

Figure 3:
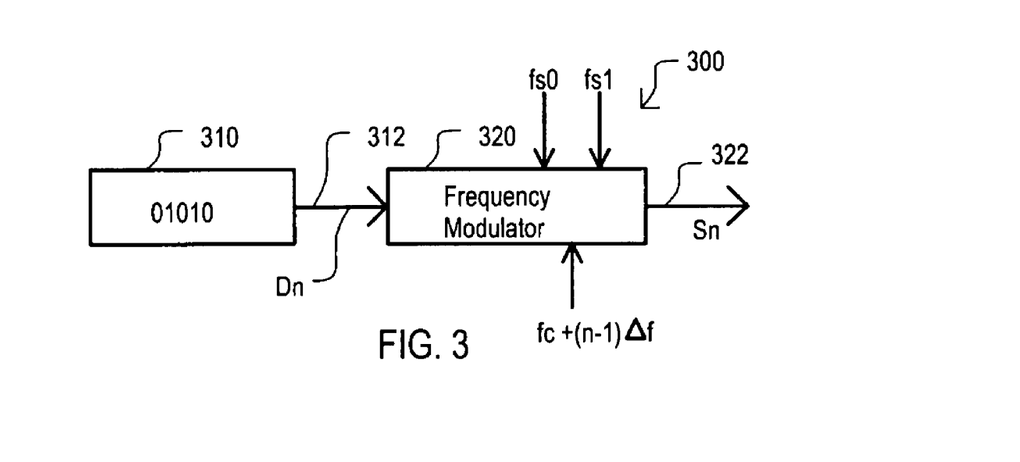
FIG. 3 is a block schematic diagram of a transmitter circuit according to an embodiment.

Referring now to FIG. 3, a block schematic diagram of a transmitter circuit according to an embodiment is set forth and given the general reference character 300. Transmitter circuit 300 may be used as the transmitter circuits (210 to 240) in the common data line sharing circuit 200 of FIG. 2.

Transmitter circuit 300 can include a data circuit 310 and a frequency modulator 320. Data circuit 310 may serially provide a stream of digital data 312, corresponding to data output Dn, at a predetermined clock frequency to frequency modulator 320. Frequency modulator 320 may perform a frequency modulation operation on the stream of data. The frequency modulator may receive a base frequency modulation signal at a frequency of $f_c+(n-1)\Delta f$ and a digital data modulating frequencies ($f_{s0}$ and $f_{s1}$) where n is from 1 to N and N is the number of transmitter circuits (210 to 240), $f_c$ may be a base carrier frequency, and $\Delta f$ may be a frequency spectrum spacing between the modulated digital data signals (S1 to S4). Digital data modulating frequencies ($f_{s0}$ and $f_{s1}$) correspond to added frequency for a data zero ($f_{s0}$) and an added frequency for a data one ($f_{s1}$).

A resultant modulated data signal 322 can then be transmitted to the common data line (for example, common data line 250 of FIG. 2). The modulated data signal 322 can correspond to a modulated digital data signal Sn (i.e. S1 to S4, in FIG. 2).

Figure 4:
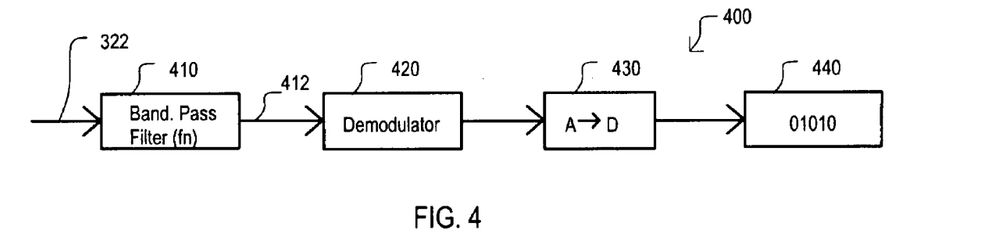
FIG. 4 is a block schematic diagram of a receiver circuit according to an embodiment.

Referring now to FIG. 4, a block schematic diagram of a receiver circuit according to an embodiment is set forth and given the general reference character 400. Receiver circuit 400 may be used as receiver circuits (260 to 290) in the common data line sharing circuit 200 of FIG. 2.

Receiver circuit 400 can include a band pass filter 410, a demodulator circuit 420, a data converter 430, and a data circuit 440. Band pass filter 410 can receive frequency modulated data 322 and may provide a band pass filtering function around a predetermined carrier frequency $f_n$. In other words, frequencies around the predetermined carrier frequency $f_n$ are allowed to pass to demodulator circuit 420 while other frequencies are attenuated and essentially do not pass through. By setting the predetermined carrier frequency $f_n$ as a predetermined frequency ($f_1$ to $f_4$), then only the modulated data from a transmitter circuit having the predetermined carrier frequency $f_n$ will be transmitted to demodulator circuit 420. Frequency modulated data 322 can be received by a common data line (for example, common data line 250 of FIG. 2).

Demodulator circuit 420 receives the modulated data signal 412 and removes the predetermined carrier frequency $f_n$ to provide the demodulated data (i.e. the original data from data circuit 310) to data converter 430. The predetermined carrier frequency $f_n$ is $f_c+(n-1)\Delta f$, where n=1 to N and N is the number of receiver circuits (260 to 290). In this way, demodulator circuit 420 may provide a signal to data converter 430 having only data modulating frequency $f_{s1}$ if the data is a data one and data modulating frequency $f_{s0}$ if the data is a data zero. Data converter 430 may detect the data modulating frequency ($f_{s0}$ or $f_{s1}$) of the received signal to provide data (i.e. the stream of digital data 312 originally provided by data circuit 310. Data converter 430 may be an analog to digital converter.

Figure 5:
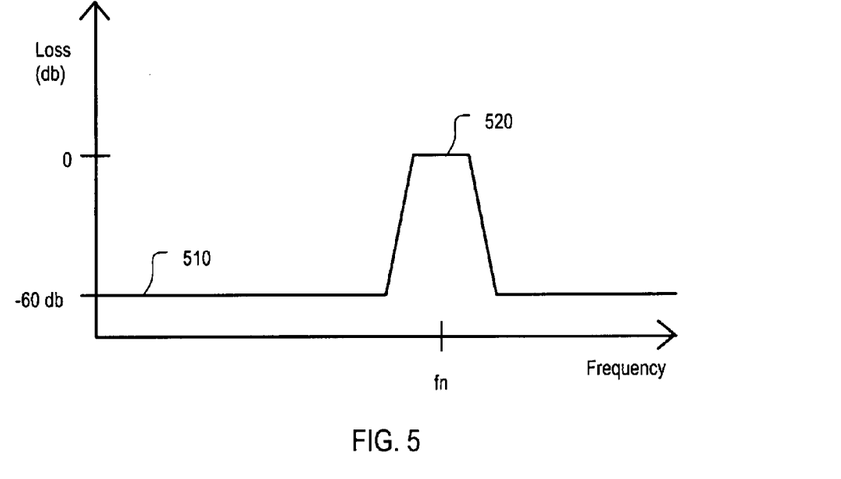
FIG. 5 is a graph illustrating a frequency response of a band pass filter according to an embodiment.

Referring now to FIG. 5, a graph illustrating a frequency response of a band pass filter according to an embodiment is set forth. The frequency response loss curve 510 of FIG. 5 can be a frequency response of a band pass filter 410 of FIG. 4 for a predetermined carrier frequency $f_n$ of a transmitter circuit (210 to 240). Band pass filter 410 can have a band pass section 520 in the frequency response loss curve 510. Essentially, frequencies around the predetermined carrier frequency $f_n$ (to include the peak frequency deviation of the predetermined modulated data signal) are allowed to pass through the band pass filter 410 while attenuating or essentially blocking other frequencies.

Figure 6:
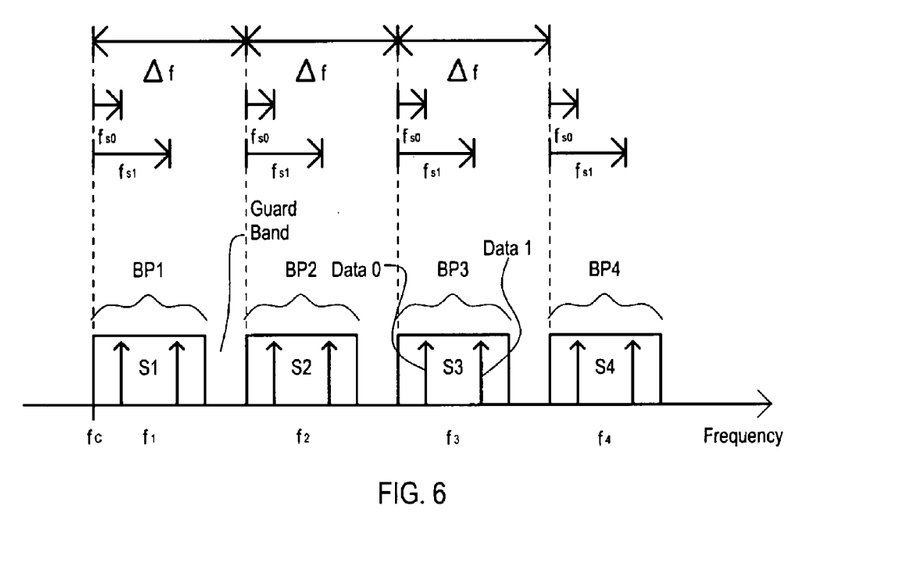
FIG. 6 is a frequency spectrum diagram according to an embodiment indicating the frequency spectrum of modulated data signals output from transmitter circuits.

Transmitter circuits (210 to 240) operate in a different frequency domain. This may be accomplished by separating the carrier frequencies ($f_1$, $f_2$, $f_3$, and $f_4$) sufficiently so that respective peak frequency deviation of each modulated signal does not result in an overlap, as will be explained with reference to FIG. 6 in conjunction with FIG. 2. Referring now to FIG. 6, a frequency spectrum diagram according to an embodiment indicating the frequency spectrum of modulated data signals (S1 to S4) output from transmitter circuits (210 to 240) of FIG. 2.

Modulated data signal S1 can be output from transmitter circuit 210 and may have a carrier frequency $f_1=f_c+(n-1)\Delta f=f_c$ for n=1 (provided by frequency modulator circuit 320, for example). Frequency modulator circuit 320 of transmitter circuit 210 may further provide digital data modulating frequency ($f_{s0}$ or $f_{s1}$) depending on whether the data being transmitted has a data zero or a data one logic value Receiver circuit 260 may include a band pass filter (such as band pass filter 410, for example) that allows the band pass frequencies BP1 to pass through while attenuating and thereby blocking other signals. In this way, only signals in the frequency spectrum transmitted from transmitter circuit 210 may be received by receiver circuit 260.

Modulated data signal S2 can be output from transmitter circuit 220 and may have a carrier frequency $f_2=f_c+(n-1)\Delta f=f_c+\Delta f$ for n=2 (provided by frequency modulator circuit 320, for example). Frequency modulator circuit 320 of transmitter circuit 220 may further provide digital data modulating frequency ($f_{s0}$ or $f_{s1}$) depending on whether the data being transmitted has a data zero or a data one logic value. Receiver circuit 270 may include a band pass filter (such as band pass filter 410, for example) that allows the band pass frequencies BP2 to pass through while attenuating and thereby blocking other signals. In this way, only signals in the frequency spectrum transmitted from transmitter circuit 220 may be received by receiver circuit 270.

Modulated data signal S3 can be output from transmitter circuit 230 and may have a carrier frequency $f_3=f_c+(n-1)\Delta f=f_c+2\Delta f$ for n=3 (provided by frequency modulator circuit 320, for example). Frequency modulator circuit 320 of transmitter circuit 230 may further provide digital data modulating frequency ($f_{s0}$ or $f_{s1}$) depending on whether the data being transmitted has a data zero or a data one logic value. Receiver circuit 280 may include a band pass filter (such as band pass filter 410, for example) that allows the band pass frequencies BP3 to pass through while attenuating and thereby blocking other signals. In this way, only signals in the frequency spectrum transmitted from transmitter circuit 230 may be received by receiver circuit 280.

Modulated data signal S4 can be output from transmitter circuit 240 and may have a carrier frequency $f_4=f_c+(n-1)\Delta f=f_c+3\Delta f$ for n=4 (provided by frequency modulator circuit 320, for example). Frequency modulator circuit 320 of transmitter circuit 240 may further provide digital data modulating frequency ($f_{s0}$ or $f_{s1}$) depending on whether the data being transmitted has a data zero or a data one logic value. Receiver circuit 290 may include a band pass filter (such as band pass filter 410, for example) that allows the band pass frequencies BP4 to pass through while attenuating and thereby blocking other signals. In this way, only signals in the frequency spectrum transmitted from transmitter circuit 240 may be received by receiver circuit 290.

Note that there can be a guard band frequency range between the frequency spectrums for each modulated data signal (S1 to S4). This is to prevent any signal interference due to, for example, the inability to create a band pass filter with sharp enough edges and thereby increase signal integrity.

Figure 7:
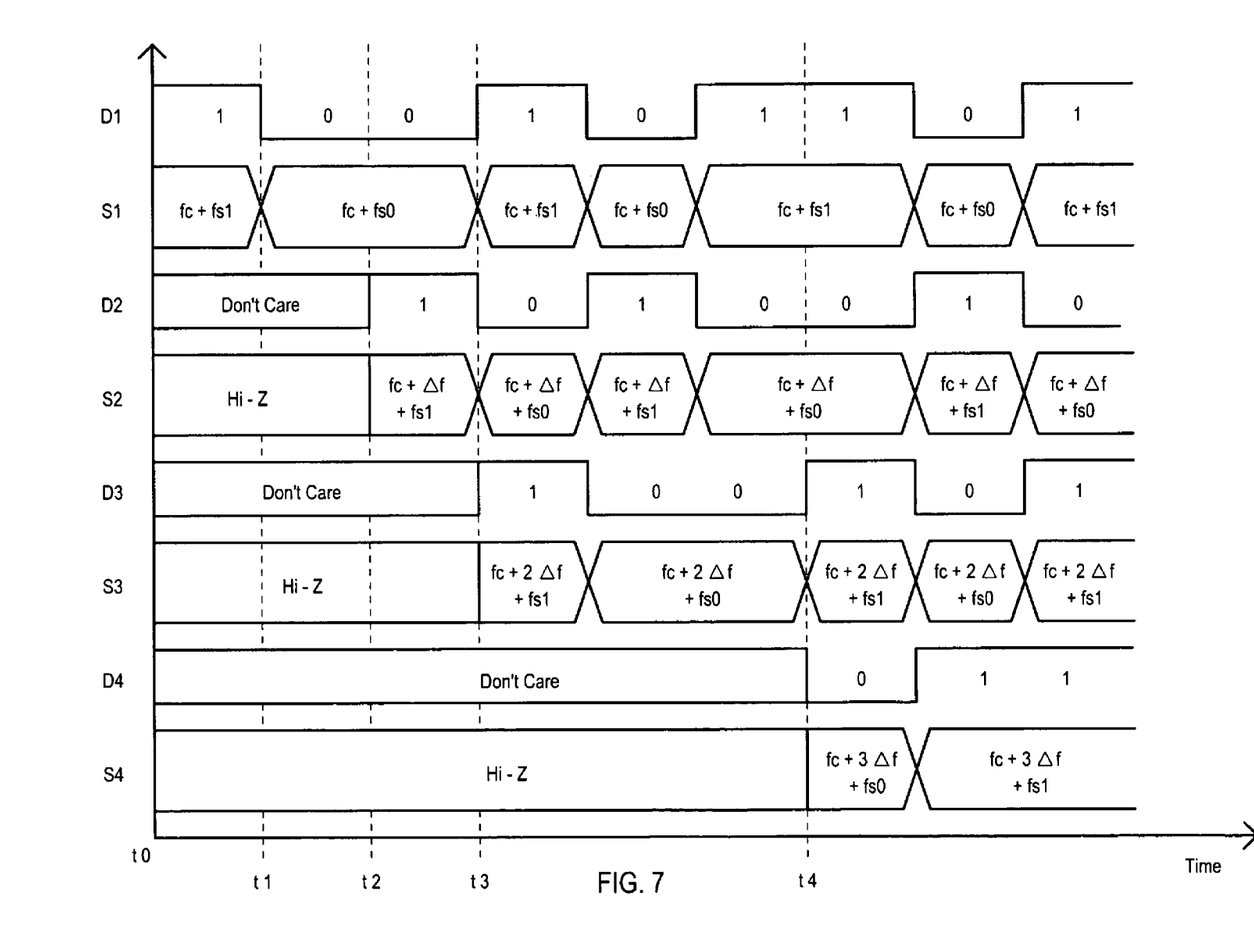
FIG. 7 is a timing diagram illustrating the operation of data line sharing circuit according to an embodiment.

A timing diagram illustrating the operation of data line sharing circuit 200 according to an embodiment is set forth in FIG. 7.

The operation of a data line sharing circuit 200 of FIG. 2, including transmitter circuits (260 to 290), such as a transmitter circuit 300 of FIG. 3, and receiver circuits (260 to 290), such as receiver circuit 400 of FIG. 3 will now be described with reference to the timing diagram of FIG. 7 in conjunction with FIGS. 2-6.

The timing diagram of FIG. 7 shows the data output Dn (not shown) comprising data outputs (D1 to D4) of the respective data circuits 310, and modulated data signals (S1 to S4) of respective transmitter circuits (210 to 240).

Transmitter circuit 210 may include a data circuit 310 that provides a data signal D1 and a frequency modulator 320 that provides a modulated data signal S1. Transmitter circuit 220 may include a data circuit 310 that provides a data signal D2 and a frequency modulator 320 that provides a modulated data signal S2. Transmitter circuit 230 may include a data circuit 310 that provides a data signal D3 and a frequency modulator 320 that provides a modulated data signal S3. Transmitter circuit 240 may include a data circuit 310 that provides a data signal D4 and a frequency modulator 320 that provides a modulated data signal S4.

At time to, data circuit 310 in transmitter circuit 210 can provide a data signal D1 having a logic "1" level. Frequency modulator 320 in transmitter circuit 210 can provide a modulated signal S1 having frequency of $f_c+f_{s1}$. At this time, transmitter circuits (220 to 240) may be disabled and provide modulated data signals (S2 to S4) having a high impedance state. Because transmitter circuits (220 to 240) are disabled, the data signals (D2 to D4) are in a "don't care" condition.

At this time, the band pass filter 410 in receiver circuit 260 allows the modulated data signal S1 to pass through because the frequency of data signal S1 falls within the band pass frequency BP1. Thus modulated data signal S1 can be passed to the demodulator 420 of receiver circuit 260. Demodulator 420 removes the predetermined carrier frequency $f_c$ to provide a signal having a digital data modulating frequency $f_{s1}$ corresponding to a data one (i.e. a logic "1" level) to the data converter 430 of receiver circuit 260. Data converter 430 may detect the data modulating frequency $f_{s1}$ to provide a digital data one to data circuit 440.

However, because the frequency of data signal S1 does not fall within the band pass frequencies (BP2 to BP4) of band pass filters 410 in respective receiver circuits (270 to 290), data signal S1 is essentially blocked from passing to the respective modulators 420 and no data is received.

At time t1, data circuit 310 in transmitter circuit 210 can provide a data signal D1 that transitions from a logic "1" level to the logic "0" level. Frequency modulator 320 in transmitter circuit 210 can provide a modulated signal S1 having a frequency of $f_c+f_{s0}$. At this time, transmitter circuits (220 to 240) may still be disabled and provide modulated data signals (S2 to S4) having a high impedance state. Because transmitter circuits (220 to 240) are disabled, the data signals (D2 to D4) remain in a "don't care" condition.

At this time, the band pass filter 410 in receiver circuit 260 allows the modulated data signal S1 to pass through because the frequency of data signal S1 falls within the band pass frequency BP1. Thus modulated data signal S1 can be passed to the demodulator 420 of receiver circuit 260. Demodulator 420 removes the predetermined carrier frequency $f_c$ to provide a demodulated data signal having a digital data modulating frequency $f_{s0}$ corresponding to a data zero (i.e. a logic "0" level) to the data converter 430 of receiver circuit 260. Data converter 430 may detect the data modulating frequency $f_{s0}$ to provide a digital data zero to data circuit 440.

However, because the frequency of data signal SI does not fall within the band pass frequencies (BP2 to BP4) of band pass filters 410 in respective receiver circuits (270 to 290), data signal S1 is essentially blocked from passing to the respective frequency demodulators 420 and no data is received.

At time t2, data circuit 310 in transmitter circuit 210 can provide a data signal D1 that remains in the logic "0" level and the operation of transmitter circuit 210 and receiver circuit 360 can remain the same. However, at time T2, transmitter circuit 220 becomes enabled and data circuit 310 in transmitter circuit 220 can provide a data signal D2 having a logic "1" level. Frequency modulator 320 in transmitter circuit 220 can provide a modulated signal S2 having a frequency of $f_c+\Delta f+f_{s1}$. At this time, transmitter circuits (330 and 340) may be disabled and provide modulated data signals (S3 and S4) having a high impedance state. Because transmitter circuits (330 and 340) are disabled, the data signals (D3 and D4) are in a "don't care" condition.

At this time, the band pass filter 410 in receiver circuit 260 allows the modulated data signal S1 to pass through because the frequency of modulated data signal S1 falls within the band pass frequency BP1 (however, modulated data signal S2 does not pass through because the frequency of modulated data signal S2 does not fall within the band pass frequency BP1). In this way, modulated data signal S1 can be passed to the demodulator 420 of receiver circuit 260. Demodulator 420 removes the predetermined carrier frequency $f_c$ to provide a signal having a digital data modulating frequency $f_{s1}$ corresponding to a data one (i.e. a logic "1" level) to the data converter 430 of receiver circuit 260. Data converter 430 may detect the data modulating frequency $f_{s1}$ to provide a digital data one to data circuit 440. Also at this time, the band pass filter 410 in receiver circuit 270 allows the modulated data signal S2 to pass through because the frequency of modulated data signal S2 falls within the band pass frequency BP2 (however, modulated data signal S1 does not pass through because the frequency of modulated data signal S1 does not fall within the band pass frequency BP1). In this way, modulated data signal S2 can be passed to the demodulator 420 of receiver circuit 270. Demodulator 420 removes the predetermined carrier frequency $f_c+\Delta f$ to provide a signal having a digital data modulating frequency $f_{s1}$ corresponding to a data one (i.e. a logic "1" level) to the data converter 430 of receiver circuit 270. Data converter 430 may detect the data modulating frequency $f_{s1}$ to provide a digital data one to data circuit 440.

However, because the frequency of modulated data signals (S1 and S3) do not fall within the band pass frequencies (BP3 to BP4) of band pass filters 410 in respective receiver circuits (280 and 290), modulated data signals (S1 and S2) are essentially blocked from passing to the respective frequency demodulators 420 and no data is received by receiver circuits (280 and 290).

Note, at time t2, transmitter circuit 210 is transmitting data through common data line 250 to receiver circuit 260 at the same time transmitter circuit 220 is transmitting data through common data line 250 to receiver circuit 270.

At time t3, data circuit 310 in transmitter circuit 210 can provide a data signal D1 that transitions from a logic "0" level to the logic "1" level. Frequency modulator 320 in transmitter circuit 210 can provide a modulated signal SI having a frequency of $f_c+f_{s1}$. Also at this time, data circuit 310 in transmitter circuit 220 can provide a data signal D2 that transitions from a logic "1" level to the logic "0" level. Frequency modulator 320 in transmitter circuit 220 can provide a modulated signal S2 having a frequency of $f_c+\Delta f+f_{s0}$. Also, at time t3, transmitter circuit 230 becomes enabled and data circuit 310 in transmitter circuit 230 can provide a data signal D3 having a logic "1" level. Frequency modulator 320 in transmitter circuit 230 can provide a modulated signal S3 having a frequency of $f_c+2\Delta f+f_{s1}$. At this time, transmitter circuit 240 may be disabled and provide a modulated data signal S4 having a high impedance state. Because transmitter circuit 240 is disabled, the data signal D4 is in a "don't care" condition.

At this time, the band pass filter 410 in receiver circuit 260 allows the modulated data signal S1 to pass through because the frequency of modulated data signal S1 falls within the band pass frequency BP1 (however, modulated data signals (S2 and S3) do not pass through because the frequency of modulated data signals (S2 and S3) do not fall within the band pass frequency BP1). In this way, modulated data signal S1 can be passed to the demodulator 420 of receiver circuit 260. Demodulator 420 removes the predetermined carrier frequency $f_c$ to provide a demodulated data signal having a digital modulating frequency $f_{s1}$ corresponding to a data one (i.e. a logic "1" level) to the data converter 430 of receiver circuit 260. Also at this time, the band pass filter 410 in receiver circuit 270 allows the modulated data signal S2 to pass through because the frequency of modulated data signal S2 falls within the band pass frequency BP2 (however, modulated data signals (S1 and S3) do not pass through because the frequency of modulated data signals (S1 and S3) do not fall within the band pass frequency BP2). In this way, modulated data signal S2 can be passed to the demodulator 420 of receiver circuit 270. Demodulator 420 removes the predetermined carrier frequency $f_c+\Delta f$ to provide a demodulated data signal having a digital data modulating frequency $f_{s0}$ corresponding to a data zero (i.e. a logic "0" level) to the data converter 430 of receiver circuit 270. Data converter 430 may detect the data modulating frequency $f_{s0}$ to provide a digital data zero to data circuit 440. Also at this time, the band pass filter 410 in receiver circuit 280 allows the modulated data signal S3 to pass through because the frequency of modulated data signal S3 falls within the band pass frequency BP3 (however, modulated data signals (S1 and S2) do not pass through because the frequency of modulated data signals (S1 and S2) do not fall within the band pass frequency BP3). In this way, modulated data signal S3 can be passed to the demodulator 420 of receiver circuit 280. Demodulator 420 removes the predetermined carrier frequency $f_c+2\Delta f$ to provide a demodulated data signal having a digital data modulating frequency $f_{s1}$ corresponding to a data one (i.e. a logic "1" level) to the data converter 430 of receiver circuit 280. Data converter 430 may detect the data modulating frequency $f_{s1}$ to provide a digital data one to data circuit 440.

However, because the frequency of modulated data signals (S1 to S3) do not fall within the band pass frequency BP4 of band pass filters 410 in respective receiver circuit 290, modulated data signals (S1 to S3) are essentially blocked from passing to the respective modulator 420 and no data is received by receiver circuit 290.

Note, at time t3, transmitter circuit 210 is transmitting data through common data line 250 to receiver circuit 260 at the same time transmitter 220 is transmitting data through common data line 250 to receiver circuit 270 and transmitter circuit 230 is transmitting data through common data line 250 to receiver circuit 280.

Between times t3 and t4, data signals D1 to D3 may transition various times. When transitions occur, respective modulated data signals (S1 to S3) may have increasing or decreasing frequencies accordingly, however, the frequencies of modulated data signals (S1 to S3) stay within the respective band pass frequencies (BP1 to BP3). In this way, the transmitter circuits (210 to 230) can transmit data to the proper respective receiver circuits (260 to 290).

At time t4, data circuit 310 in transmitter circuit 210 can provide a data signal D1 that transitions remain at a logic "1". Frequency modulator 320 in data circuit 210 can provide a modulated signal S1 having a frequency of $f_c+f_{s1}$. Also at this time, data circuit 310 in transmitter circuit 220 can provide a data signal D2 that has a logic "0" level. Frequency modulator 320 in data circuit 220 can provide a modulated signal S2 having a frequency of $f_c+\Delta f+f_{s0}$. Data circuit 310 in transmitter circuit 230 can provide a data signal D3 that transitions from a logic "0" level to the logic "1" level. Frequency modulator 320 in data circuit 230 can provide a modulated signal S3 having a frequency of $f_c+2\Delta f+f_{s1}$. Also, at time t4, transmitter circuit 240 becomes enabled and data circuit 310 in transmitter circuit 240 can provide a data signal D4 having a logic "0" level. Frequency modulator 320 in transmitter circuit 240 can provide a modulated signal S4 having frequency of $f_c+3\Delta f+f_{s0}$.

At this time, the band pass filter 410 in receiver circuit 260 allows the modulated data signal S1 to pass through because the frequency of modulated data signal S1 falls within the band pass frequency BP1 (however, modulated data signals (S2, S3, and S3) do not pass through because the frequency of modulated data signals (S2, S3, and S3) do not fall within the band pass frequency BP1). In this way, modulated data signal S1 can be passed to the demodulator 420 of receiver circuit 260. Demodulator 420 removes the predetermined carrier frequency $f_c$ to provide a signal having a digital data modulating frequency $f_{s1}$ corresponding to a data one (i.e. a logic "1" level) to the data converter 430 of receiver circuit 260. Data converter 430 may detect the data modulating frequency $f_{s1}$ to provide a digital data one to data circuit 440. Also at this time, the band pass filter 410 in receiver circuit 270 allows the modulated data signal S2 to pass through because the frequency of modulated data signal S2 falls within the band pass frequency BP2 (however, modulated data signals (S1, S3, and S4) do not pass through because the frequency of modulated data signals (S1, S3, and S4) do not fall within the band pass frequency BP2). In this way, modulated data signal S2 can be passed to the demodulator 420 of receiver circuit 270. Demodulator 420 removes the predetermined carrier frequency $f_c+\Delta f$ to provide a signal having a digital data modulating frequency $f_{s0}$ corresponding to a data zero (i.e. a logic "0" level) to the data converter 430 of receiver circuit 270. Data converter 430 may detect the data modulating frequency $f_{s0}$ to provide a digital data zero to data circuit 440. Also at this time, the band pass filter 410 in receiver circuit 280 allows the modulated data signal S3 to pass through because the frequency of modulated data signal S3 falls within the band pass frequency BP3 (however, modulated data signals (S1, S2, and S4) do not pass through because the frequency of modulated data signals (S1, S2, and S4) do not fall within the band pass frequency BP3). In this way, modulated data signal S3 can be passed to the demodulator 420 of receiver circuit 280. Demodulator 420 removes the predetermined carrier frequency $f_c+2\Delta f$ to provide a demodulated data signal having a digital data modulating frequency $f_{s1}$ corresponding to a data one (i.e. a logic "1" level) to the data converter 430 of receiver circuit 280. Data converter 430 may detect the data modulating frequency $f_{s1}$ to provide a digital data one to data circuit 440. Also at this time, the band pass filter 410 in receiver circuit 290 allows the modulated data signal S4 to pass through because the frequency of modulated data signal S4 falls within the band pass frequency BP4 (however, modulated data signals (S1, S2, and S3) do not pass through because the frequency of modulated data signals (S1, S2, and S3) do not fall within the band pass frequency BP4). In this way, modulated data signal S4 can be passed to the demodulator 420 of receiver circuit 290. Demodulator 420 removes the predetermined carrier frequency $f_c+3\Delta f$ to provide a demodulated data signal having a digital data modulating frequency $f_{s0}$ corresponding to a data zero (i.e. a logic "0" level) to the data converter 430 of receiver circuit 290. Data converter 430 may detect the data modulating frequency $f_{s0}$ to provide a digital data zero to data circuit 440.

Note, at time t4, transmitter circuits (210 to 240) are all simultaneously transmitting data through common data line 250 to respective receiver circuits (260 to 290).

According to the embodiment of FIGS. 2 to 7, any number of transmitter circuits (210 to 240) may simultaneously transmit data through a common data line 250 to respective receiver circuits (260 to 290). Although only four transmitter circuits (210 to 240) and four receiver circuits (260 to 290) are shown, there may be as many transmitter circuits (210 to 240) and receiver circuits (260 to 290) as can be accommodated by the operable frequency spectrum. The timing diagram of FIG. 7 illustrates that any of the respective transmitter circuits (210 to 240) may begin the transmission of their respective data at any time regardless of the simultaneous transmission of data by any other of the respective transmitter circuits (210 to 240) and the transmitted data may be received from common data line 250 at a respective receiver circuit (260 to 290) even when data is being simultaneously transmitted to any of the other receiver circuits (260 to 290).

Figure 8:
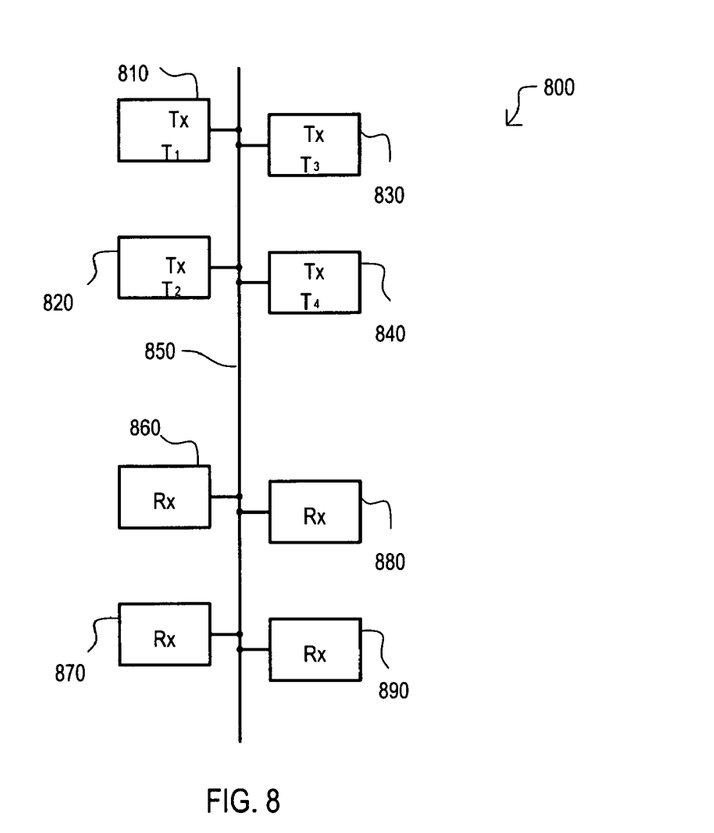
FIG. 8 is a block schematic diagram of a common data line sharing circuit according to an embodiment is set forth.

Referring now to FIG. 8, a block schematic diagram of a common data line sharing circuit according to an embodiment is set forth and given the general reference character 800.

Common data line sharing circuit 800 can be integrated on a single semiconductor device. Common data line sharing circuit 800 can include transmitter circuits (810 to 840) and receiver circuits (860 to 890). Transmitter circuits (810 to 840) and receiver circuits (860 to 890) may share a common data line 850. Common data line 850 can be a data line wiring using, for example, a metal wiring layer or the like in a semiconductor device.

Each transmitter circuit (810 to 840) may transmit coded data in a predetermined timing window. Transmitter circuit 810 may transmit data that has coded data in a timing window $T_1$. Transmitter circuit 820 may transmit data that has coded data in a timing window $T_2$. Transmitter circuit 830 may transmit data that has coded data in a timing window $T_3$. Transmitter circuit 840 may transmit data that has coded data in a timing window $T_4$. Timing windows ($T_1$, $T_2$, $T_3$ and, $T_4$) are different non-overlapping timing windows.

Each receiver circuit (860 to 890) include a timing monitoring operation. In this way, each receiver circuit (860 to 890) can receive coded data from a predetermined transmitter circuit (810 to 840). Receiver circuit 860 may receive coded data in timing window $T_1$. Receiver circuit 870 may receive coded data in timing window $T_2$. Receiver circuit 880 may receive coded data in timing window $T_3$. Receiver circuit 890 may receive coded data in timing window $T_4$. In this way, transmitter circuits (810 to 840) can transmit coded data to a predetermined receiver circuit (860 to 890) along a common data line 850 by transmitting data at a respective predetermined timing window ($T_1$ to $T_4$).

Note although the common data line sharing circuit 800 of FIG. 7, shows four transmitter circuits (810 to 740) and four receiver circuits (860 to 890), there may be any number of transmitter and/or receiver circuits having predetermined timing windows.

Figure 9:
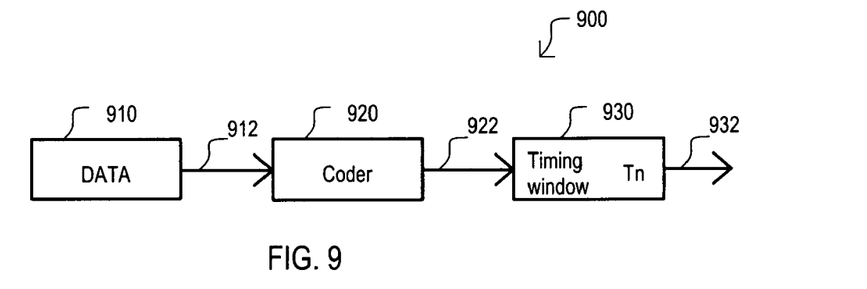
FIG. 9 is a block schematic diagram of a transmitter circuit according to an embodiment.

Referring now to FIG. 9, a block schematic diagram of a transmitter circuit according to an embodiment is set forth and given the general reference character 900. Transmitter circuit 900 may be used as the transmitter circuits (810 to 840) in the common data line sharing circuit 800 of FIG. 8.

Transmitter circuit 900 can include a data circuit 910, a coder circuit 920, and a timing circuit 930. Data circuit 910 may provide data 912 to coder circuit 920. Coder circuit may provide coded data signal 932 during a predetermined timing window $T_N$ determined by timing circuit 930. Coded data signal 932 can then be transmitted to the common data line (for example, common data line 850 of FIG. 8).

Alternatively, a coder may code the data received from data circuit 910 and store it locally until it is transmitted during the allocated timing window.

Figure 10:
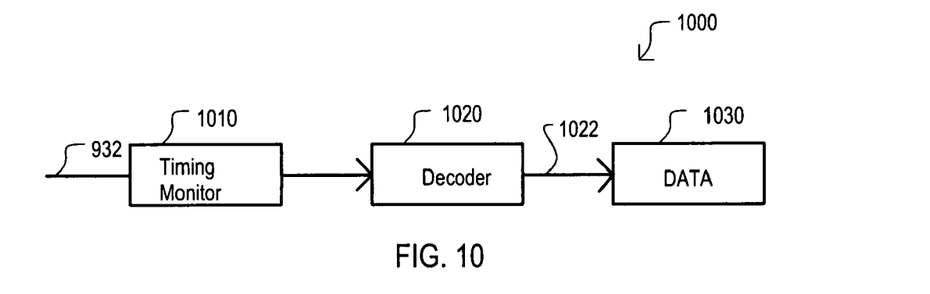
FIG. 10 is a block schematic diagram of a receiver circuit according to an embodiment.

Referring now to FIG. 10, a block schematic diagram of a receiver circuit according to an embodiment is set forth and given the general reference character 1000. Receiver circuit 1000 may be used as receiver circuits (860 to 890) in the common data line sharing circuit 800 of FIG. 8.

Receiver circuit 1000 can include a timing monitor circuit 1010, a decoder 1020, and a data circuit 1030. Timing monitor circuit 1010 can pass coded data 932 to decoder 1020 during a predetermined timing window $T_N$. Decoder circuit 1020 can receive the coded data 932 and provide output data 1022 to data circuit 1030. By using timing monitor 1010 to provide a predetermined timing window $T_N$ as a respective predetermined timing window ($T_1$ to $T_4$), only the coded data transmitted from a transmitter circuit (810 to 840) can be received by a respective receiver circuit (860 to 890).

Figure 11:
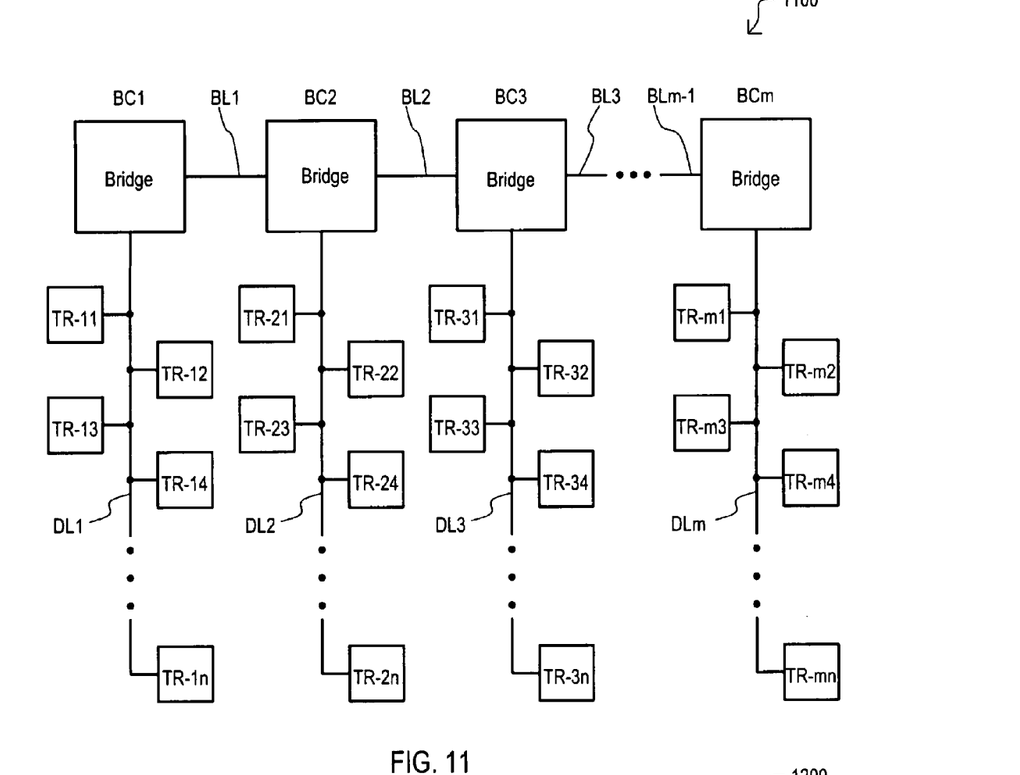
FIG. 11 is a block schematic diagram of a common data line signaling system according to an embodiment.

Referring now to FIG. 11, a common data line signaling system according to an embodiment is set forth in a block schematic diagram and given the general reference character 1100.

Common data line signaling system 1100 may include data transmitter/receiver circuits (TR-11 to TR-mn) and bridge circuits (BC1 to BCm).

A column of data transmitter/receiver circuits (TR-11 to TR-1n) may be connected to a common data line DL1. A column of data transmitter/receiver circuits (TR-21 to TR-2n) may be connected to a common data line DL2. A column of data transmitter/receiver circuits (TR-31 to TR-3n) may be connected to a common data line DL3. A column of data transmitter/receiver circuits (TR-m1 to TR-mn) may be connected to a common data line DLm, where m=number of common data lines and n=number of data transmitter/receiver circuits connected to each common data line.

Bridge circuit BC1 may have an input/output terminal connected to common data line DL1 and an input/output terminal connected to a bridge line BL1. Bridge circuit BC2 may have an input/output terminal connected to bridge line BL1, an input output terminal connected to common data line DL2, and an input/output terminal connected to bridge line BL2. Bridge circuit BC3 may have an input/output terminal connected to bridge line BL2, an input/output terminal connected to common data line DL3, and an input/output terminal connected to bridge line BL3. Bridge circuit BCm may have an input/output terminal connected to bridge line BL(m-1) and an input output terminal connected to common data line DLm.

Figure 12:
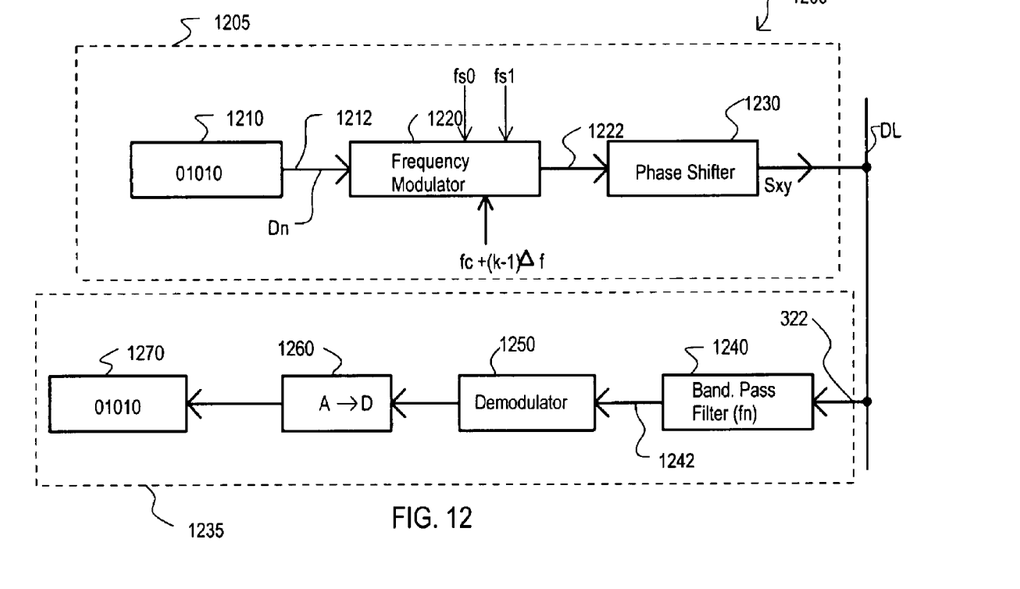
FIG. 12 is a block schematic diagram of a data transmitter/receiver circuit according to an embodiment.

Referring now to FIG. 12 a block schematic diagram of a data transmitter/receiver circuit according to an embodiment is set forth and given the general reference character 1200. Data transmitter/receiver circuit 1200 may be used for each of data transmitter/receiver circuits (TR-11 to TR-mn). Data transmitter/receiver circuit 1200 may include a data transmitter circuit 1205 and a data receiver circuit 1235.

Data transmitter circuit 1205 may include a data circuit 1210, a frequency modulator 1220, and a phase shifter 1230. Data circuit 1210 may serially provide a stream of digital data 1212 at a predetermined clock frequency to frequency modulator 1220. Frequency modulator 1220 may perform a frequency modulation operation on the stream of data. The frequency modulator may receive a base frequency modulation signal at a frequency of $f_c+(k-1)\Delta f$ and a digital data modulating frequencies ($f_{s0}$ and $f_{s1}$) where k is from 1 to n and n is the number of transmitter circuits (TR-11 to TR-mn) connected to a common data line (DL1 to DLm), $f_c$ may be a base carrier frequency, and $\Delta f$ may be a frequency spectrum spacing between the modulated digital data signals. Phase shifter 1230 may then perform a phase shifting operation on the modulated data signal 1222 to provide a phase shifted modulated data signal Sxy.

A resultant phase shifted modulated data signal Sxy can then be transmitted to a common data line (for example, a respective common data line (DL1 to DLm) of FIG. 11).

Data receiver circuit 1235 may include a band pass filter 1240, a demodulator circuit 1250, a data converter 1260, and a data circuit 1270. Band pass filter 1240 can receive phase shifted frequency modulated data Sxy from a common data line (for example, a respective common data line (DL1 to DLm) and may provide a band pass filtering function around a predetermined carrier frequency $f_n$. In other words, frequencies around the predetermined carrier frequency $f_n$ are allowed to pass to demodulator circuit 1250 while other frequencies are attenuated and essentially do not pass through. By setting the predetermined carrier frequency $f_n$, then only the modulated data from a transmitter circuit having the predetermined carrier frequency $f_n$ will be transmitted to demodulator circuit 1250. Phase shifted frequency modulated data Sxy can be received by a respective common data line (DL1 to DLm).

Demodulator circuit 1250 receives the modulated data signal 1242 and removes the predetermined carrier frequency $f_n$ to provide the demodulated data (i.e. the original data from data circuit 1210) to data converter 1260. The predetermined carrier frequency $f_k$ is $f_c+(k-1)\Delta f$, where n=1 to n and n is the number of data transmitter/receiver circuits (TR-11 to TRmn) connected to a respective common data line (DL1 to DLm). In this way, demodulator circuit 1250 may provide a signal to data converter 1260 having only data modulating frequency $f_{s1}$ if the data is a data one and data modulating frequency $f_{s0}$ if the data is a data zero. Data converter 1260 may detect the data modulating frequency ($f_{s0}$ or $f_{s1}$) of the received signal to provide data (i.e. the stream of digital data 1212 originally provided by a data circuit 1210. Data converter 1260 may be an analog to digital converter.

In each column of data transmitter/receiver circuits (TR-11 to TR-1n, TR-21 to TR-2n, TR-31 to TR-3n, and TR-m1 to TR-mn), the data transmitter circuit 1205 can operate at carrier frequency $f_k=f_c+(k-1)\Delta f$, where k=1 to n. In other words, data transmitter/receiver circuits (TR-11, TR-21, TR-31, and TR-m1) may all operate at a carrier frequency $f_1=f_c$, data transmitter/receiver circuits (TR-12, TR-22, TR-32, and TR-m2) may all operate at a carrier frequency $f_2=f_c+\Delta f$, data transmitter/receiver circuits (TR-13, TR-23, TR-33, and TR-m3) may all operate at a carrier frequency $f_3=f_c+2\Delta f$, data transmitter/receiver circuits (TR-14, TR-24, TR-34, and TR-m4) may all operate at a carrier frequency $f_4=f_c+3\Delta f$, and data transmitter/receiver circuits (TR-1n, TR-2n, TR-3n, and TR-mn) may all operate at a carrier frequency $f_n=f_c+(n-1)\Delta f$. In this way, a carrier frequency may be identified with a predetermined row of data transmitter/receiver circuits (TR-11 to TR-mn).

In each data transmitter circuit 1205 for each data transmitter/receiver circuit (TR-11, TR-21, TR-31, and TR-m1), phase shifter 1230 may provide a predetermined phase shift in accordance as to which column of data transmitter/receiver circuits (TR-11 to TR-1n, TR-21 to TR-2n, TR-31 to TR-3n, and TR-m1 to TR-mn) is to receive the phase shifted modulated data Sxy. Each bridge circuit (BC1 to BCm) may include a phase filter circuit that only allows signals having the predetermined phase shift for the predetermined common data line (DL1 to DLm) pass through.

For example, assuming data transmitter/receiver circuit TR-14 is transmitting data to be received by data transmitter/receiver circuit TR-m4. Data transmitter circuit 1205 of transmitter receiver circuit TR-14 may provide phase shifted modulated data S14 having a carrier frequency $f_4=f_c+3\Delta f$ and having a predetermined phase shift PSm (corresponding to a phase shift that bridge circuit BCm passes to common data line DLm. Bridge circuit BC1 receives phase shifted modulated data S14 and drives phase shifted modulated data S14 onto bridge line BL1. Bridge circuit BC2 can receive phase shifted modulated data S14. Because phase shifted modulated data S14 does not have a predetermined phase shift PS2 (corresponding to a phase shift that bridge circuit BC2 passes to common data line DL2), bridge circuit BC2 blocks phase shifted modulated data S14 from being passed to common data line DL2 and passes phases shifted modulated data S14 onto bridge line BL2. Bridge circuit BC2 can receive phase shifted modulated data S14. Because phase shifted modulated data S14 does not have a predetermined phase shift PS3 (corresponding to a phase shift that bridge circuit BC3 passes to common data line DL3), bridge circuit BC3 blocks phase shifted modulated data S14 from being passed to common data line DL3 and passes phases shifted modulated data S14 onto bridge line BL3. Series connected bridge circuits continue to pass the phase shifted modulated data S14 to an adjacent bridge line while blocking phase shifted modulated data S14 to the corresponding data line until bridge circuit BCm receives the phase shifted modulated data S14 from bride line BLm-1.

When bridge circuit BCm receives the phase shifted modulated data S14 having a predetermined phase shift PSm, the phase filter in bridge circuit BCm passes the phase shifted modulated data S14 onto common data line DLm. Because only data transmitter/receiver circuit TR-m4 has a data receiver circuit 1235 that includes a band pass filter 1240 tuned to pass the predetermined frequency $f_4 = f_c + 3\Delta f$, the phase shifted modulated data S14 may be passed to the demodulator circuit 1250 of data transmitter/receiver circuit TR-m4. However, because phase shifted modulated data S14 does not have a predetermined carrier frequency that band pass filters 1240 of data transmitter/receiver circuits (TR-m1 to TR-m3 and TR-mn) pass, phase shifted modulated data S14 may be essentially blocked from data transmitter/receiver circuits (TR-m1 to TR-m3 and TR-mn).

At the same time that data transmitter/receiver circuit TR-14 is transmitting data to data transmitter/receiver circuit TR-m4, other data transmitter/receiver circuits may be transmitting data between each other. For example, data transmitter/receiver circuit TR-32 may be transmitting data to any of data transmitter/receiver circuit (TR-12, TR22, or TRm2) by transmitting data at the predetermined carrier frequency $f_2 = f_c + \Delta f$ and having the corresponding predetermined phase shift (PS1, PS2 or PSm).

According to the embodiment of FIGS. 11 and 12, any number of data transmitter/receiver circuits (TR-11 to TR-mn) may simultaneously transmit data to a data transmitter/receiver circuit (TR-11 to TR-mn) along the same row in a simultaneous fashion by utilizing a dedicated frequency spectrum identified with a predetermined row of data transmitter/receiver circuits (TR-11 to TR-mn).

Figure 13:
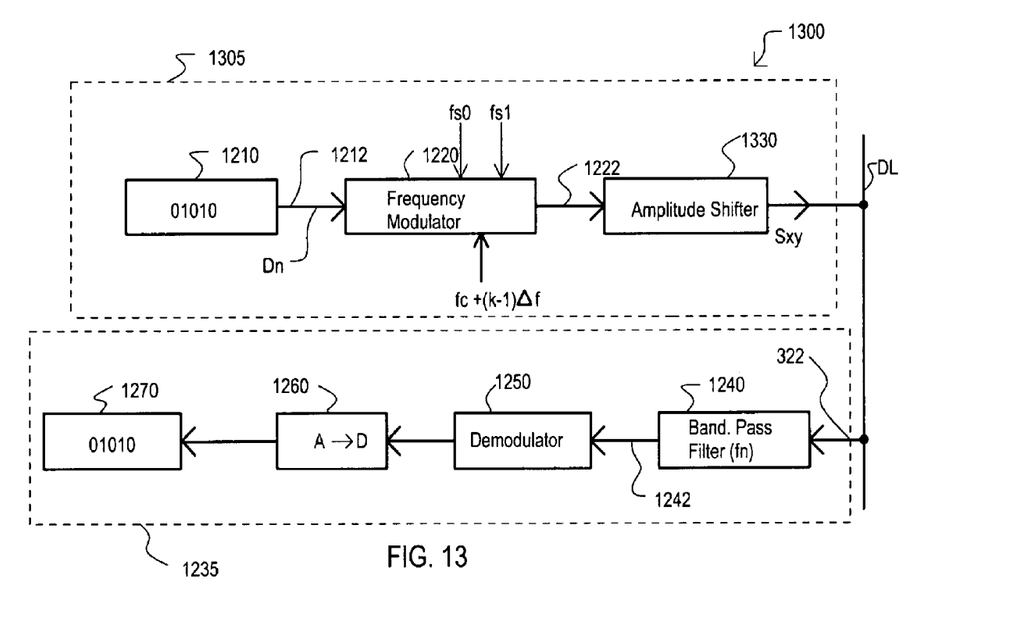
FIG. 13 is a block schematic diagram of a data transmitter/receiver circuit according to an embodiment.

Referring now to FIG. 13, a block schematic diagram of a data transmitter/receiver circuit is set forth and given the general reference character 1300. Data transmitter/receiver circuit 1300 may be used for data transmitter/receiver circuits (TR-11 to TR-mn) in common data line signaling system 1100 of FIG. 11.

Data transmitter/receiver circuit 1300 may differ from data transmitter receiver circuit 1200 in that an amplitude shifter 1330 may be included in data transmitter circuit 1305 instead of phase shifter circuit 1230 of data transmitter circuit 1205. Otherwise, the structure and operation of data transmitter/receiver circuit 1300 may be the same as data transmitter/receiver circuit 1200 of FIG. 12.

In the embodiment of FIG. 13, data transmitter circuit 1305 may provide amplitude shifted modulated data signal Sxy. In this case, each data line (DL1 to DLm) may only receive data from a bridge circuit BCm if the amplitude has a predetermine shift or modulation corresponding to the amplitude shift or modulation to be passed to the corresponding common data line (DL1 to DLm).

In yet another embodiment, a data transmitter/receiver circuit (TR-11 to TR-mn) of FIG. 11 may provide an address value to identify the common data line (DL1 to DLm) in which the data is to be received by a respective data transmitter/receiver circuit (TR-11 to TR-mn). In this case, each data line (DL1 to DLm) may only receive data from a bridge circuit BCm if the modulated data (S11 to Smn) includes the predetermined address value that allows the modulated data to be passed(S11 to Smn) to the corresponding common data line (DL1 to DLm).

In yet another embodiment, a data transmitter/receiver circuit (TR-11 to TR-mn) of FIG. 11 may provide code value to identify the common data line (DL1 to DLm) in which the data is to be received by a respective data transmitter/receiver circuit (TR-11 to TR-mn). In this case, each data line (DL1 to DLm) may only receive data from a bridge circuit BCm if the modulated data (S11 to Smn) includes the predetermined code value that allows the modulated data to be passed(S11 to Smn) to the corresponding common data line (DL1 to DLm).

Figure 14:
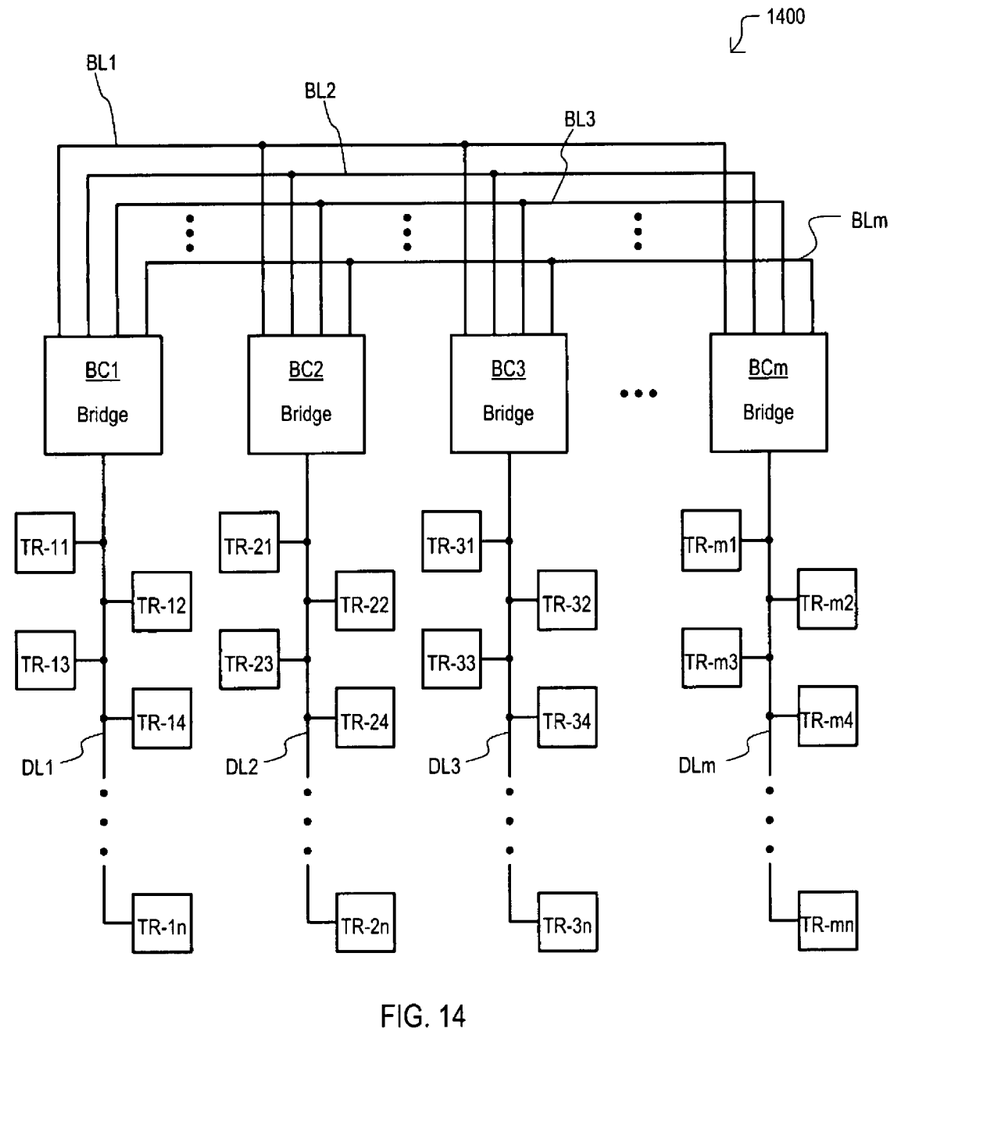
FIG. 14 is a block schematic diagram of a common data line signaling system according to an embodiment.

Referring now to FIG. 14, a block schematic diagram of a common data line signaling system according to an embodiment is set forth and given the general reference character 1400.

In the embodiment of FIG. 14, each bridge circuit (BC1 to BCm) may have a dedicated bridge line (BL1 to BLm). This may be accomplished by modifying the common data line signaling system 1100 of FIG. 11 to include m bridge lines (BL1 to BLm) in parallel and connected to each bridge circuit (BC1 to BCm) as illustrated in common data line signaling system 1400 of FIG. 14.

In this case, based on coded information in the transmitted signal, a respective bridge circuit (BC1 to BCm) may transmit the modulated data signal Sxy to a predetermined bridge line (BL1 to BLm) to be received by a predetermined bridge circuit (BC1 to BCm) and transmitted to the predetermined bridge circuits (BC1 to BCm) respective shared data line (DL1 to DLm).

In the above embodiments, the predetermined phase shift, predetermined amplitude shift or modulation, predetermined address value or predetermined code value, as just two examples, that identifies the corresponding common data line (DL1 to DLm) in which modulated data is to be passed may be conceptualized as including a parametric to the frequency modulated data being transmitted.

In the embodiments, the frequency modulators (320 and 1220) can include high frequency components such as bipolar junction transistors (BJTs), or the like, that have a high cut-off frequency, such as 30-50 GHz. However, other components, such as data circuit 310 may include insulated gate field effect transistors (IGFETs) or junction field effect transistors (JFETs), or the like, that may operate at lower frequencies and with less current consumption.

In an alternative embodiment, data may be programmed in the phase of the frequency modulated signal (S1 to S4). For example, a frequency fn with a phase of zero may represent a logic zero and a phase of $\pi/2$ may represent a logic one.

Data transmitter/receiver circuits (TR-11 to TR-mn) may be referred to as data circuits. A data circuit may include a transmitter circuit and/or a receiver circuit like any of the transmitter circuits or receiver circuits described above.

Reference in the description to "one embodiment" or "an embodiment" means that a particular feature, structure, or characteristic described in connection with the embodiment is included in at least one embodiment of the invention. The appearance of the phrase "in one embodiment" in various places in the specification do not necessarily all refer to the same embodiment. The term "to couple" or "electrically connect" as used herein may include both to directly and to indirectly connect through one or more intervening components.

Further it is understood that the embodiments of the invention may be practiced in the absence of an element or step not specifically disclosed. That is an inventive feature of the invention may include an elimination of an element.

While various particular embodiments set forth herein have been described in detail, the present invention could be subject to various changes, substitutions, and alterations without departing from the spirit and scope of the invention. Accordingly, the present invention is intended to be limited only as defined by the appended claims.

What is claimed is:

1. An integrated circuit (IC) device, comprising:
a first data transmission circuit coupled to provide first data to a common data line;
a second data transmission circuit coupled to provide second data to the common data line while the first data is being provided by the first data transmission circuit;
a first receiver circuit coupled to receive the first data from the common data line while essentially excluding receiving the second data; and
a second receiver circuit coupled to receive the second data from the common data line while essentially excluding receiving the first data wherein
the first data transmission circuit includes a first frequency modulator circuit coupled to receive the first data at a predetermined frequency and provide first modulated data at a first carrier frequency to the common data line;
the second data transmission circuit includes a second frequency modulator circuit coupled to receive the second data at essentially the predetermined frequency and provide second modulated data at a second carrier frequency to the common data line; and
the first receiver circuit includes a first band pass filter coupled to the common data line, the first band pass filter allowing the first carrier frequency to pass to a first band pass filter output while essentially excluding the second carrier frequency from passing to the first band pass filter output.

2. The IC device of claim 1, wherein:
the second receiver circuit includes a second band pass filter coupled to the common data line, the second band pass filter allowing the second carrier frequency to pass to a second band pass filter output while essentially excluding the first carrier frequency from passing to the second band pass filter output.

3. The IC device of claim 2, wherein:
the first band pass filter has a first pass frequency range and the second band pass filter has a second pass frequency range and the first pass frequency range and the second pass frequency range are non-overlapping.

4. The IC device of claim 1, wherein:
the first receiver circuit further includes a first demodulator coupled to receive the first band pass filter output and removing the first carrier frequency to provide first demodulated data at a first demodulator output.

5. The IC device of claim 2, wherein:
the second receiver circuit further includes a second demodulator coupled to receive the second band pass filter output and removing the second carrier frequency to provide second demodulated data at a second demodulator output.

6. The IC device of claim 1, wherein:
the first data transmitter circuit includes a first data circuit that serially transmits data at the predetermined frequency to the first frequency modulator and the predetermined frequency is substantially lower than the first carrier frequency.

7. The IC device of claim 1, wherein:
the first data transmission circuit and the second data transmission circuit provide the first and second data to the common data line simultaneously.

8. An integrated circuit (IC) device, comprising:
a first data transmission circuit coupled to provide first data to a common data line in a first timing window;
a second data transmission circuit coupled to provide second data to the common data line at a second timing window;
a first receiver circuit coupled to receive the first data from the common data line at the first timing window; and
a second receiver circuit coupled to receive the second data from the common data line at a second timing window wherein
the first data transmission circuit includes a first coder circuit coupled to receive the first data and provide first coded data to the common data line;
the second data transmission circuit includes a second coder circuit coupled to receive the second data and provide second coded data to the common data line;
the first data transmission circuit includes a first timing circuit that allows the first coder circuit to provide the first coded data to the common data line during the first timing window; and
the second data transmission circuit includes a second timing circuit that allows the second coder circuit to provide the second coded data to the common data line during the second timing window.

9. The IC device of claim 8, wherein:
the first receiver circuit includes a first decoder circuit coupled to receive the first coded data from the common data line and provide first decoded data at a first decoder output; and
the second data receiver circuit includes a second decoder circuit coupled to receive the second coded data from the common data line and provide second decoded data at a second decoder output.

10. The IC device of claim 9, wherein:
the first receiver circuit includes a first timing monitor circuit that allows the first decoder circuit to receive the first coded data and provide the first decoded data essentially during the first timing window; and
the second receiver circuit includes a second timing monitor circuit that allows the second decoder circuit to receive the second coded data and provide the second decoded data essentially during the second timing window.

11. A method of data transmission using a common data line on an integrated circuit (IC) device, including the steps of:
providing first data by a first transmitter circuit to a common data line;
providing second data by a second transmitter circuit to the common data line while providing the first data to the common data line; and
receiving the first data by a first receiver circuit while essentially excluding receiving the second data by the first receiver circuit wherein
the step of providing the first data includes receiving unmodulated first data and using frequency modulation at a first carrier frequency to provide first frequency modulated data as the first data;
the step of providing the second data includes receiving unmodulated second data and using frequency modulation at a second carrier frequency to provide second frequency modulated data as the second data; and the step of receiving first data by a first receiver circuit includes receiving the first frequency modulated data by a first band pass filter that essentially excludes the second frequency modulated data.

12. The method of claim 11, further including the step of:

receiving the second data by a second receiver circuit while essentially excluding receiving the first data by the second receiver circuit.

13. The method of claim 11, wherein:

the step of providing the first data further includes providing a digital data modulating frequency in accordance with a data value of the unmodulated first data as the first frequency modulated data.

14. The method of claim 11, further including the step of: demodulating the first frequency modulated data to provide first demodulated data.

15. The method of claim 11, further including the step of: receiving the second data by a second receiver circuit while essentially excluding the second data.

16. The method of claim 15, wherein:

the step of receiving second data by the second receiver circuit includes receiving the second frequency modulated data by a second band pass filter that essentially excludes the first frequency modulated data.

17. The method of claim 16, further including the step of: demodulating the second frequency modulated data to provide second demodulated data.

\* \* \* \* \*